J. H. FREE.
SAW.
APPLICATION FILED MAR. 4, 1915.
1,240,331.
Patented Sept. 18, 1917.
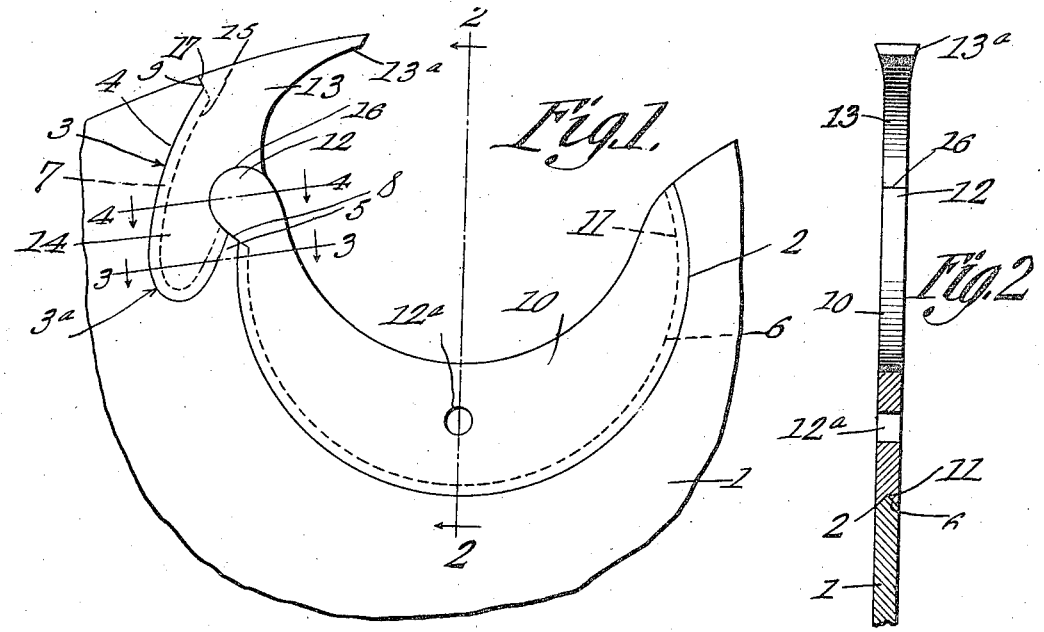
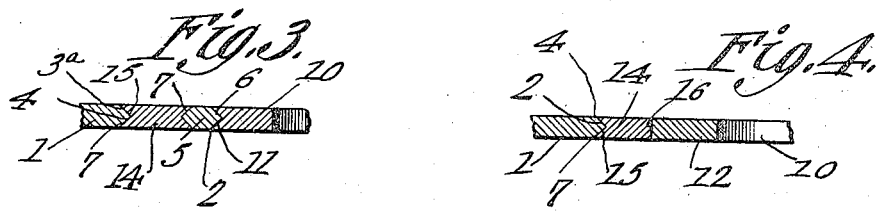
Witnesses
Inventor
J. H. Free
by
Attorneys

UNITED STATES PATENT OFFICE.

JOHN H. FREE, OF PORTLAND, OREGON.

SAW.

1,240,331. Specification of Letters Patent. Patented Sept. 18, 1917.

Application filed March 4, 1915. Serial No. 12,030.

*To all whom it may concern:*

Be it known that I, JOHN H. FREE, a citizen of the United States, residing at Portland, in the county of Multnomah and State of Oregon, have invented a new and useful Saw, of which the following is a specification.

The present invention appertains to saws, and relates more particularly to saws having removable and insertible teeth or bits.

It is the object of this invention to provide a saw, having removable or inserted bits or teeth assembled therewith in a unique manner, whereby the toothed or cutting portion of the saw will be substantial and efficient in use, to enable the saw to withstand great wear and tear, as when sawing logs or heavy lumber, and whereby the teeth or bits may be readily removed and replaced when worn out or broken.

With the foregoing and other objects in view which will appear as the description proceeds, the invention resides in the combination and arrangement of parts and in the details of construction hereinafter described, it being understood that changes in the precise embodiment of the invention herein disclosed, can be made within the scope of what is claimed without departing from the spirit of the invention.

The invention is illustrated in its preferred embodiment in the accompanying drawing, wherein—

Figure 1 is a fragmental elevation of a saw illustrating one of the improved teeth or bits applied thereto.

Figs. 2, 3 and 4 are sectional views taken on the lines 2—2, 3—3 and 4—4, respectively, of Fig. 1.

Fig. 5 is an edge view of the saw blade or plate, with the bit and its holder removed.

In the drawing, there is illustrated a fragmental portion of the saw blade or plate 1, illustrating one of the bit or tooth structures, it not being necessary to illustrate the complete saw, since saws of this general character are well known in the art.

In carrying out the present invention, the edge or periphery of the saw blade or plate 1 is provided with a primary or main recess 2, and a secondary recess 3 at one end of the primary recess 2, it being understood, of course, that a pair of the said recesses is provided for each tooth or bit throughout the extent of the sawing or cutting edge of the saw blade. The primary recess 2 has an arcuate edge extending through an arc of slightly over 180 degrees, and the secondary recess 3 is provided with an arcuate edge 4 concentric with the edge of the primary recess and having a radius greater than that of the edge of the primary recess. There is a projecting horn 5 between the recesses 2 and 3, which defines the adjacent ends of the recesses, and which separates them. The secondary recess 3 is provided with a deep lobe-shaped pocket 3ᵃ between the said arcuate edge 4 thereof and the horn 5.

The arcuate edge of the recess 2 is V-shaped, as at 6, throughout the length thereof, and to the end of the horn 5, and the edges of the secondary recess 3 are V-shaped throughout their length, as at 7, the V-shaped edge 7 of the recess 3 extending from along the arcuate edge 4, around the pocket 3ᵃ and to the end of the horn 5. The free end of the horn 5 is blunt or flat, as at 8, in an oblique plane. The blade 1 is also provided with a blunt or flat oblique shoulder or abutment 9 between the periphery or margin of the blade, and the outer end of the edge 4 of the recess 3.

A crescent-shaped holder 10 is fitted snugly within the primary recess 2, and is provided with a V-shaped groove along its convexed edge and engaging the V-shaped edge 6 of the said recess, to retain the holder snugly and firmly in place, and to enable it to be rotated or swung about the center of curvature of the edge of the primary recess, when the bit or tooth is to be removed or inserted, as will hereinafter appear. The holder 10 is provided at one end with a rounded knob or lobe 12, bearing or seating against the blunt end of the horn 5, and the holder 10 is provided at an intermediate point with an aperture 12ᵃ for the engagement of a special wrench for swinging or shifting the holder 10.

The bit 13 fits snugly within the secondary recess 3, and is provided with a sharp wedge-shaped cutting point 13ᵃ, and with an elongated lobe-shaped end 14 remote from the cutting point 13ᵃ, and seated snugly within the pocket 3ᵃ of the secondary recess, between the horn 5 and edge 4 of the said recess. The edges of the bit 13 have a V-shaped groove 15 extending around the lobe-shaped end 14 of the bit, and engaging the V-shaped edges of the secondary recess to hold the bit snugly in place within the secondary recess of the saw blade or plate, and whereby the bit cannot be accidentally detached laterally or sidewise, even though the saw is subjected to sudden shocks and strains.

The bit 13 is also provided with a rounded socket 16 adjacent the horn 5, and which snugly receives the knob 12 of the holder 10. The bit 13 has a V-shaped heel 17 at its outer end seating against the abutment 9 of the saw blade 1, to assist in holding the cutting point 13$^a$ of the bit in proper operative position.

With the present assemblage or combination of the component elements, the bits will be firmly and effectively held in place, and will not yield or loosen even when subjected to considerable shocks and strains. It has been found with prevailing types of saws of this character, that the bits or teeth not infrequently become loosened or disengaged, which is objectionable, for the reason that it impairs the operation of the saw, and often injures the saw blade to such an extent that it cannot be repaired. The present structure, however, eliminates the possibility of the bit or tooth becoming loosened or detached during the sawing operation.

In order to remove the bit 13 when it becomes worn or broken, the holder 10 is swung or rotated through the medium of a special wrench engaged through the aperture 12$^a$, whereby the knob or lobe end 12 of the holder will move outwardly to shift the bit 13 along the edge 4 of the recess 3, so that the bit can be removed. When the holder 10 is swung so as to bring the knob or lobe 12 thereof at a point sufficiently beyond the horn 5, a new bit may be readily inserted between the knob 12 and edge 4 of the recess 3, so that the socket 16 of the bit will engage the knob 12, and whereby the holder 10 may be swung back to normal position, to move the bit into place within the recess 3 and its pocket 3$^a$. It is essential that the lobe-shaped end 14 of the bit fit within the pocket 3$^a$ of the secondary recess 3, behind the horn 5, to hold the bit in a substantial manner, it also being noted that the socket 16 of the bit being engaged to the knob 12 of the holder, and the knob being seated against the horn 5, will materially assist in bracing the bit. Importance is attached to the provision of the deep pocket 3$^a$ in which the elongated lobe-shaped portion 14 fits, to hold the bit firmly in place, assisted by the seating of the rounded overhanging knob 12 upon the blunt or flat end of the horn 5.

Having thus described the invention, what is claimed as new is:

A saw comprising a blade having a relatively large primary recess with an arcuate edge and a relatively small secondary recess at one end of the primary recess, there being a horn between the recesses, the horn having a blunt flat end, the secondary recess having an arcuate edge concentric with the edge of the primary recess, the secondary recess having a deep lobe-shaped pocket between its arcuate edge and the horn, a bit resting against said arcuate edge of the secondary recess and having an elongated lobe-shaped portion fitted snugly in said pocket to hold the bit firmly in place, and a crescent-shaped holder fitted within the primary recess and having a rounded overhanging knob at one end seating against the blunt end of the horn, the bit having a rounded socket adjacent to and flush with the blunt end of the horn snugly receiving said knob to assist in steadying the bit.

In testimony that I claim the foregoing as my own, I have hereto affixed my signature in the presence of two witnesses.

JOHN H. FREE.

Witnesses:
C. M. BISHOP,
G. J. BARETT.

Copies of this patent may be obtained for five cents each, by addressing the "Commissioner of Patents, Washington, D. C."